United States Patent
Montgomery et al.

(10) Patent No.: US 12,186,679 B2
(45) Date of Patent: Jan. 7, 2025

(54) REAR-ENTRY STYLE SEAT ON MOTION-BASED ATTRACTION

(71) Applicant: Universal City Studios LLC, Universal City, CA (US)

(72) Inventors: Clifton Amir Montgomery, Windermere, FL (US); Sarah Anne Kelley, Orlando, FL (US); Keith Michael McVeen, Winter Garden, FL (US); Eric Rae Parr, Orlando, FL (US); Eric Allan Vance, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 374 days.

(21) Appl. No.: 17/693,910

(22) Filed: Mar. 14, 2022

(65) Prior Publication Data
US 2022/0379228 A1  Dec. 1, 2022

Related U.S. Application Data

(60) Provisional application No. 63/193,390, filed on May 26, 2021.

(51) Int. Cl.
*A63G 31/16* (2006.01)
*A63G 31/02* (2006.01)
*G06F 3/01* (2006.01)

(52) U.S. Cl.
CPC ............. *A63G 31/16* (2013.01); *A63G 31/02* (2013.01); *G06F 3/017* (2013.01)

(58) Field of Classification Search
CPC .......... A63G 7/00; A63G 31/00; A63G 31/02; A63G 31/16; G06F 3/017

USPC ................................ 472/43, 59, 60, 61, 130
See application file for complete search history.

(56) References Cited

U.S. PATENT DOCUMENTS

| 8,308,232 | B2 | 11/2012 | Zamperla et al. |
| 8,453,567 | B2 | 6/2013 | Aiba |
| 10,668,395 | B1* | 6/2020 | Lee ..................... A63G 31/02 |
| 2005/0001466 | A1 | 1/2005 | Zambelli et al. |
| 2018/0304160 | A1 | 10/2018 | White et al. |
| 2019/0094540 | A1* | 3/2019 | Greenwood ......... H04L 67/131 |
| 2019/0351341 | A1* | 11/2019 | Blum ..................... A63G 7/00 |

FOREIGN PATENT DOCUMENTS

| WO | 2004073818 A1 | 9/2004 |
| WO | 2020250136 A1 | 12/2020 |

OTHER PUBLICATIONS

PCT/US2022/028771 International Search Report and Written Opinion mailed Aug. 29, 2022.
https://www.vekoma.com/custom-designed-coasters/tron-light-cycle-power-run (retrieved Mar. 10, 2022).
https://www.zamperla.com/products/disko-coaste (retrieved Mar. 10, 2022).
https://rcdb.com/4138.htm (retrieved Mar. 10, 2022).

* cited by examiner

*Primary Examiner* — Kien T Nguyen
(74) *Attorney, Agent, or Firm* — Fletcher Yoder, P.C.

(57) ABSTRACT

A ride vehicle includes a platform including a front portion and a rear portion. The ride vehicle also includes a row of seats disposed on the platform. Each seat of the first row of seats is configured so a passenger loads from the rear and once seated the passenger faces the front portion. The ride vehicle is configured so that each passenger enters the ride vehicle via the rear portion.

19 Claims, 9 Drawing Sheets

REAR-ENTRY STYLE SEAT ON MOTION-BASED ATTRACTION

CROSS-REFERENCE TO RELATED APPLICATION

This application claims priority to and the benefit of U.S. Provisional Application No. 63/193,390, entitled "REAR-ENTRY STYLE SEAT ON MOTION-BASED ATTRACTION" and filed May 26, 2021, which is incorporated by reference herein in its entirety for all purposes.

BACKGROUND

The present disclosure relates generally to the field of amusement parks. More specifically, embodiments of the present disclosure relate to methods and equipment used in conjunction with amusement park rides.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Since the early twentieth century, amusement parks (or theme parks) have substantially grown in popularity. Certain amusement park rides have been created to provide riders with unique motion and visual experiences. For example, amusement park rides can include ride vehicles that travel along a path or that utilize a motion base. However, some of these ride vehicles may limit the degree of freedom of the rider to move and, thus, the ability of the rider to interact with the ride environment. Accordingly, it may be desirable to provide a ride vehicle that provides the rider with a greater degree of freedom to interact with the ride environment.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a ride vehicle includes a platform including a front portion and a rear portion. The ride vehicle also includes a row of seats disposed on the platform. Each seat of the row of seats is configured so a passenger loads from the rear and once seated the passenger faces the front portion. The ride vehicle is configured so that each passenger enters the ride vehicle via the rear portion.

In an embodiment, a ride system includes a ride vehicle. The ride vehicle includes a platform. The ride vehicle also includes multiple seats disposed on the platform and oriented in a same direction. Each seat of the multiple seats is configured so that a passenger loads from a rear and once seated the passenger faces forward. Each seat includes a pad configured to be disposed about a front of the seated passenger and a back restraint configured to both contact a back of the seated passenger in a seating configuration and translate out of the seating configuration into a loading configuration. The pad and the back restraint are configured to enable the seated passenger freedom of movement with their arms and upper torso to interact with a ride environment while in the seating configuration.

In an embodiment, a method for loading a ride vehicle includes orientating the ride vehicle so that each passenger enters the ride vehicle from behind each seat of multiple seats. Each seat is oriented in a same direction. Each seat includes a pad configured to be disposed about a front of a seated passenger and a back restraint configured to contact a back of the seated passenger. The method also includes maintaining a back restraint of each seat in a lowered position as passengers load respective seats from the rear. The method further includes raising the back restraint of each seat to contract the back of the seated passenger so that the seated passenger is seated in an upright position between the pad and the back restraint to enable the seated passenger freedom of movement with their arms and upper torso to interact with a ride environment while securing the seated passenger to the ride vehicle.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments of the disclosure are directed to systems and methods for providing passengers on a ride vehicle (e.g., dark ride vehicle) more degrees of freedom to interact with the ride (e.g., dark ride). For example, the disclosed systems and methods include a ride vehicle that includes a platform with multiple rows of seats disposed on it, where each seat is oriented in a same direction (e.g., towards a front portion of the platform or the ride vehicle). Each passenger enters the ride vehicle from the rear before loading a seat. Each seat includes a pad (e.g., front restraint) that engages a front of a seated passenger. Each seat also includes a back restraint that remains in a lowered position (e.g., adjacent the platform) while the passenger loads the seat and then raises against the passenger's back once the passenger is seated. The pad and the back restraint enable a seated passenger freedom of movement with their arms and upper torso to interact with the ride (e.g., virtually or physically). The ride vehicle may include a transport system (e.g., motion base or reaction deck) that enables movements of the ride vehicle in six degrees of freedom. The ride vehicle may travel along a track or trackless ride environment. The unique seating of the ride vehicle provides the passenger more mobility and, thus, a greater degree of freedom to interact with the ride environment.

Figure 1:
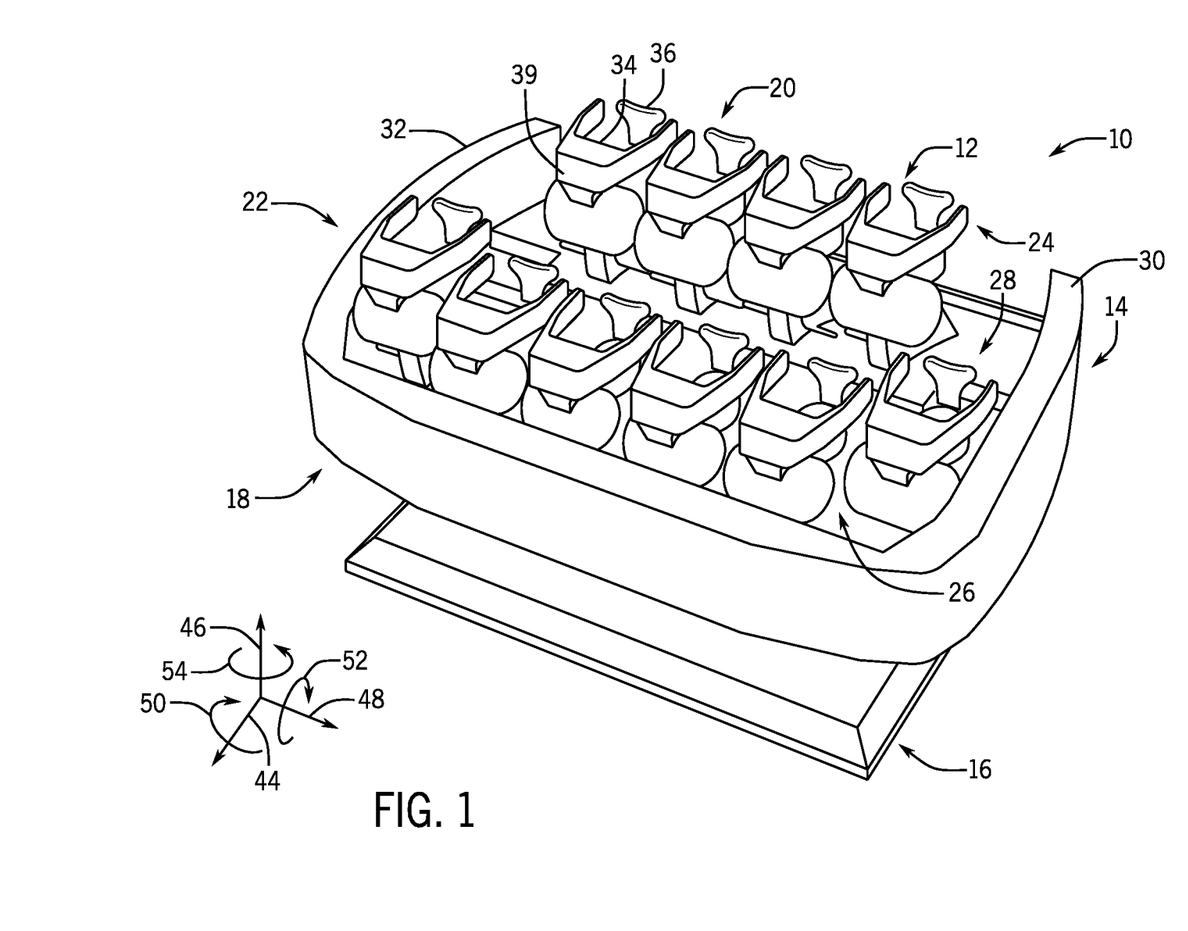
FIG. 1 is a front perspective view of an embodiment of a ride vehicle (e.g., dark ride vehicle) having rear-entry style seats, in accordance with an aspect of the present disclosure.
Figure 2:
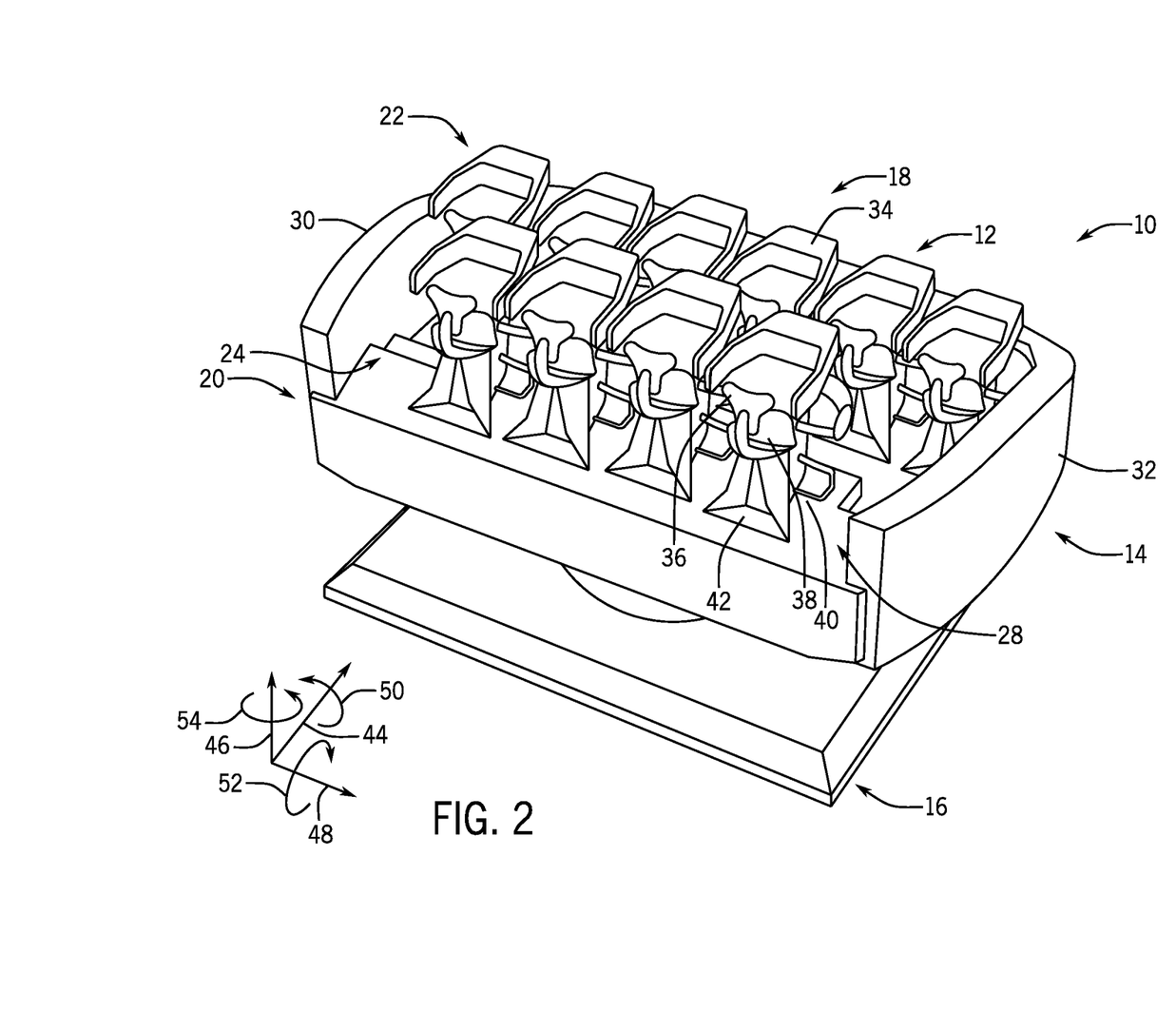
FIG. 2 is a rear perspective view of an embodiment of the ride vehicle of FIG. 1, in accordance with an aspect of the present disclosure.

FIGS. 1 and 2 are front and rear perspective views, respectively, of an embodiment of a ride vehicle 10 (e.g., dark ride vehicle) having rear-entry style seats or seat modules 12 (e.g., bike style seats). One or more of the ride vehicles 10 may be utilized as part of a motion-based attraction in a dark environment. The ride vehicle 10 includes a platform 14 coupled to a transport system 16. The platform 14 includes a front portion 18 and a rear portion 20. Front and rear are defined relative to how a passenger or rider is oriented when seated in one of the seats 12. For example, a seated passenger faces toward the front portion 18 with their back facing the rear portion 20. As depicted, a first row 22 of the seats 12 is disposed on the platform 14 adjacent the front portion 18 and a second row 24 of the seats 12 is disposed on the platform 14 adjacent the rear portion 20. In the illustrated embodiment, the platform 14 includes multiple levels or decks varying in height. For example, the first row 22 and the second row 24 of the seats 12 are disposed on decks 26, 28, respectively. Deck 26 is disposed lower than (e.g., beneath) deck 28 to enable passengers seated within the second row 24 to have an unhindered view. Passengers descend steps from the deck 28 to the deck 26 to get to the first row 22 of the seats 12. The numbers of rows of seats 12 and the number of decks may vary (e.g., 1, 2, 3, etc.). The number of seats 12 per row may also vary (e.g., 2, 3, 4, 5, 6, etc.). In certain embodiments, the number of seats 12 within each row may vary between rows. For example, as depicted, the number of seats 12 in the first row 22 and the second row 24 are 6 and 4, respectively. In certain embodiments, each row of seats 12 may include a same name number of seats 12. As depicted, the seats 12 at the end of the rows 22, 24 are flanked by panels 30, 32. The platform 14 is open in front of the first row 22 and behind the second row 24. The openness in front of the first row 22 enables a presentation to be viewed by all of the passengers in the ride vehicle 10. For example, a presentation (providing loading and/or ride instructions and/or providing content related to the theme of the ride) may be presented while the passengers load the ride vehicle 10. The openness behind the second row 24 enables each passenger to load the ride vehicle 10 from the rear (i.e., rear portion 20). Thus, each passenger prior to loading the ride vehicle 10 will be located behind all of the seats 12.

Figure 3:
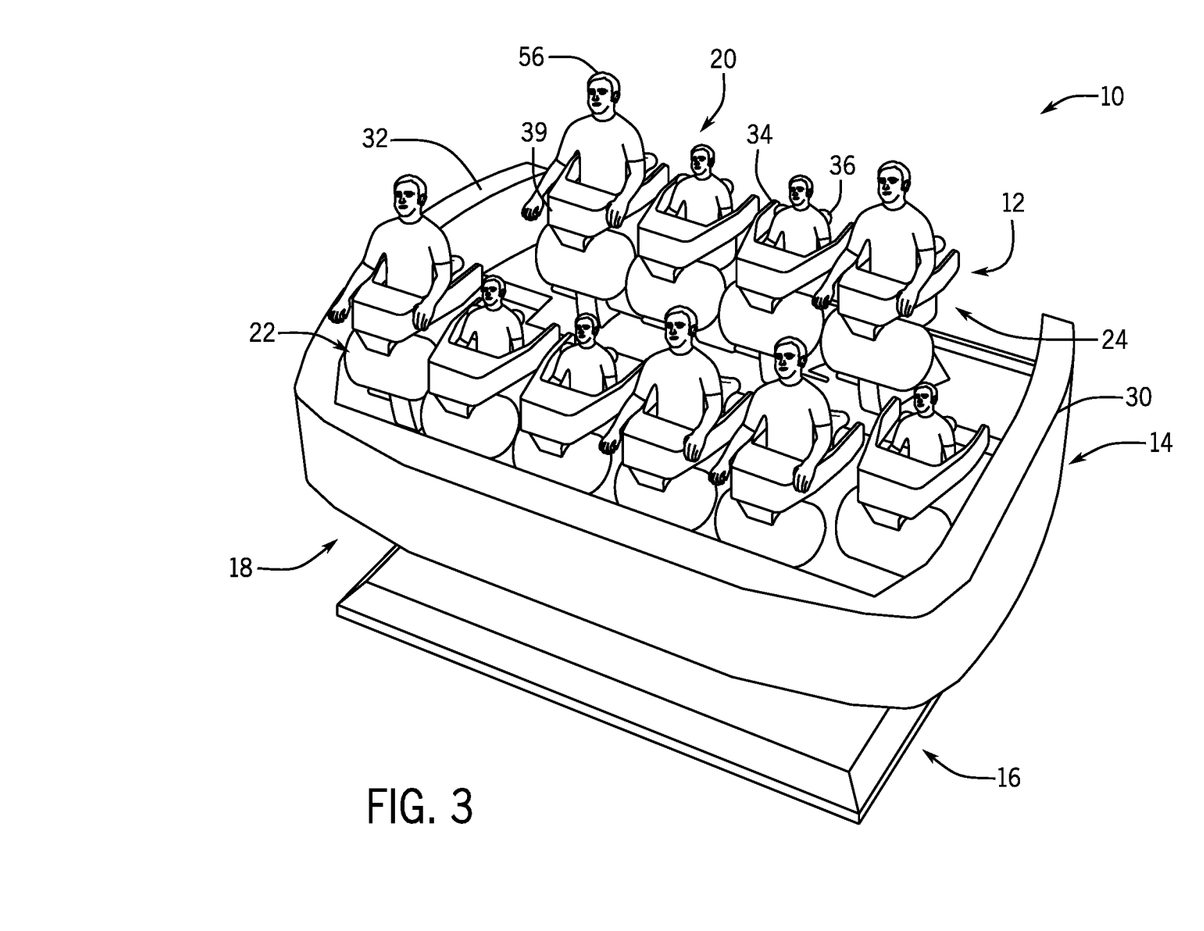
FIG. 3 is a front perspective view of an embodiment of the ride vehicle of FIG. 1 with seated passengers, in accordance with an aspect of the present disclosure.

Each seat 12 includes a front restraint 34, a rear restraint 36, and a seat portion 38 (shown in FIG. 2). In certain embodiments, each seat 12 may include other features (e.g., handle bars, monitors, etc.). The seat portion 38 supports the passenger upon loading the seat 12 (e.g., sitting on the seat portion 38). The front restraint 34 (e.g., a padded bar or structure) extends around a front portion of the seated passenger to provide stability. As depicted, the front restraint 34 has a U-like shape. The shape of the front restraint 34 may vary from this. The front restraint 34 may be part of or disposed on a frame 39 defining the area of the seat 12. The rear restraint 36 (e.g., back restraint) contacts and supports the back of the seated passenger to provide seated support. A portion of the rear restraint 36 (i.e., the portion contacting the passenger's back) may include a padded structure (e.g., padding disposed over metal). During loading of the vehicle 10, the rear restraint 36 is in a lowered position adjacent the platform 14 (e.g., loading configuration). In certain embodiments, the rear restraint 36 may contact the platform 14 in the lowered position. While the rear restraints 36 are in the lowered position, the passengers enter the ride vehicle 10 from the rear portion 20 (e.g., via a loading platform). Once at their respective seat 12, the passenger straddles the seat portion 38 from the rear to sit. The seat portion 38 may be shaped (e.g., as an elongate narrow shape) for this purpose, with dimensions that allow for passenger straddling. Once the passengers are seated, the rear restraints 36 are raised until they contact the passengers' backs (e.g., seating configuration) to facilitate seated support. Together, the front restraint 34 and the rear restraint 36 provide the passenger (while seated in an upright position) the stability to enable freedom of movement with their arms and upper torso to interact with the ride (e.g., as depicted in FIG. 3 with passengers 56 seated on the ride vehicle 10). For example, passengers may interact with different elements of the ride virtually (e.g., via augmented reality (AR) or virtual reality (VR)) or physically (e.g., soft robotics or something similar). In certain embodiments, each seat 12 may include a foot rest 40 on each side of the seating portion 38 for placing a foot within or on. In some embodiments, the each seat 12 may include a cup on each side of the seating portion 38 for placing a knee within. Each seat 12 may also include ride-themed elements 42 (e.g., wheels as depicted in FIGS. 1 and 2) to enhance the ride environment.

In certain embodiments, each seat 12 may include various transducers disposed within various components of the seat 12 (e.g., handle bars, front restraint 34, rear restraint 36, seating portion 38, etc.). For example, an audible output may be provided to a passenger via a speaker. The seat 12 may include tactile transducers that provide stimuli to different parts of the passenger (e.g., face, hands, back, etc.). For example, air or water may be directed at the passenger. Also, a scent may be released. Also, haptic stimuli may be provided by an object pushing against or contacting a portion of the passenger. Also, a temperature of a portion of the seat 12 may be adjusted to provide a stimulus.

In certain embodiments, each passenger may be provided an AR or VR headset that the passenger wears on their head during the ride that enables the passenger to interact with an AR or VR environment related to the theme of the ride. The AR or VR headset for each seat 12 may be coupled (e.g., physically, electronically, communicatively, etc.) to the seat 12 and/or the ride vehicle 10.

In certain embodiments, each seat 12 may include a gesture tracking system (e.g., within an equipment box incorporated within the seat 12). The gesture tracking system may be coupled to a controller of the ride vehicle 10 (e.g., located on or remotely from the ride vehicle 10) and track the gestures of the seated passenger. In response to the detected gestures of the passenger, a movement of the ride vehicle 10 may be altered. For example, the ride vehicle 10 may spin, turn, alter a path, or change orientation. The ride vehicle 10 may alter movement based on the gestures of one passenger or multiple passengers. In certain embodiments, the detected gestures may alter what the passenger sees within their respective AR or VR headset. Similar responses may be performed based on or in conjunction with other movements of the one or multiple passengers detected by other aspects of the ride vehicle 10, such as detectors in the seat 12 that track weight shifts of the one or multiple passengers.

The transport system 16 enables movements of the ride vehicle 10 in at least three degrees of freedom (e.g., directions in alignment with the ride vehicle 10 and parallel to direction 44, direction 46, and direction 48). In certain embodiments, the transport system 16 enables movements of the ride vehicle 10 in six degrees of freedom. For example, movements of the ride vehicle 10 may occur in parallel with the direction 44, the direction 46, the direction 48, roll 50, pitch 52, and yaw 54. The transport system 16 and the platform 14 may interact to form a motion base or reaction deck. For example, the transport system 16 may include wheels, linkages (e.g., between the transport system 16 and the platform 14), and other devices to enable the different movements of the ride vehicle 10. The transport system 16 may act as an automated guide vehicle (AGV) in moving the ride vehicle 10 along its path through the ride environment (e.g., trackless dark ride environment). As an AGV, the ride vehicle 10 may travel along a substantially smooth ride path, for example via the assistance of optics, markers, magnets, sensors, or a combination thereof. In certain embodiments, the transport system 16 may be coupled to a track to enable movement of the ride vehicle 10 along the track in the ride environment (e.g., dark ride environment).

Figure 4:
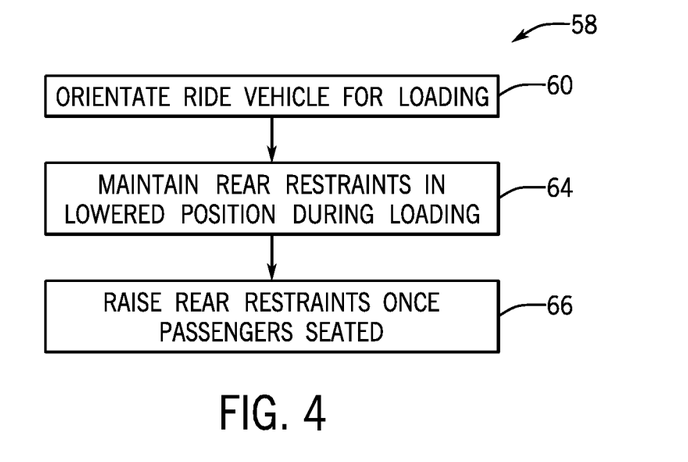
FIG. 4 is a flow chart of an embodiment of a method for loading the ride vehicle in FIG. 1, in accordance with an aspect of the present disclosure.
Figure 5:
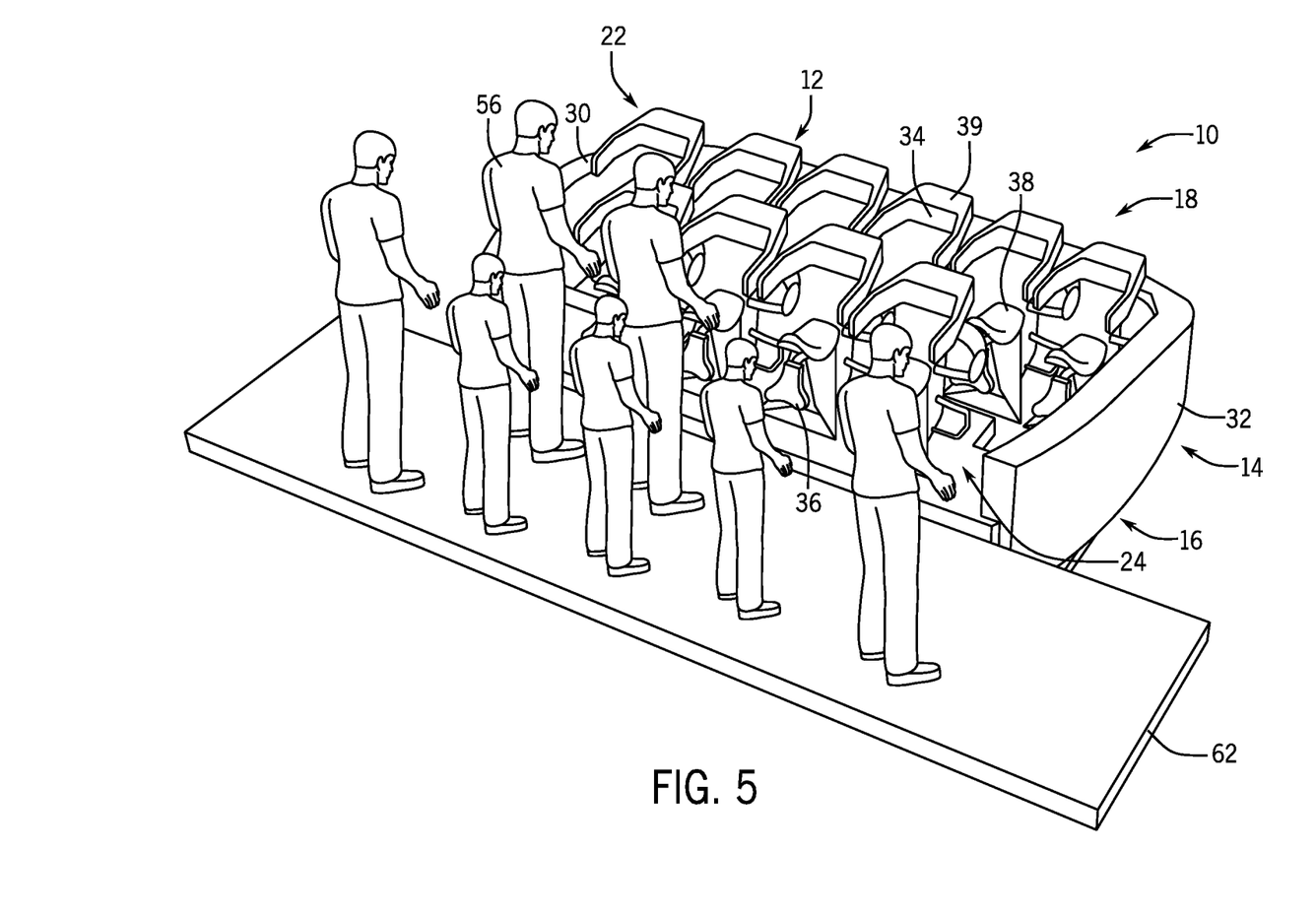
FIG. 5 is a rear perspective view of an embodiment of the ride vehicle of FIG. 1 with passengers on a load platform, in accordance with an aspect of the present disclosure.
Figure 6:
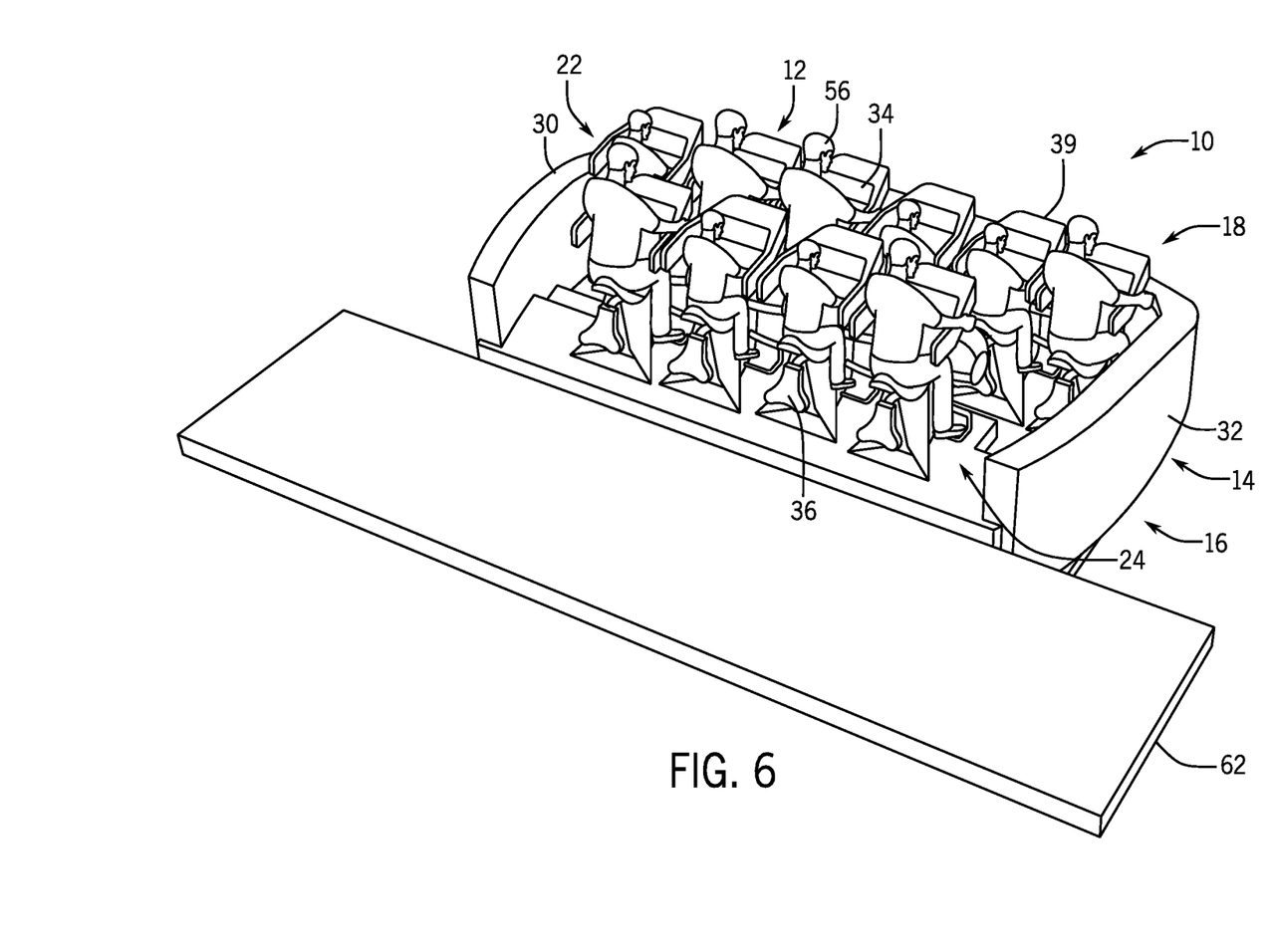
FIG. 6 is a rear perspective view of an embodiment of the ride vehicle of FIG. 1 with passengers seated (e.g., with rear restraints lowered), in accordance with an aspect of the present disclosure.
Figure 7:
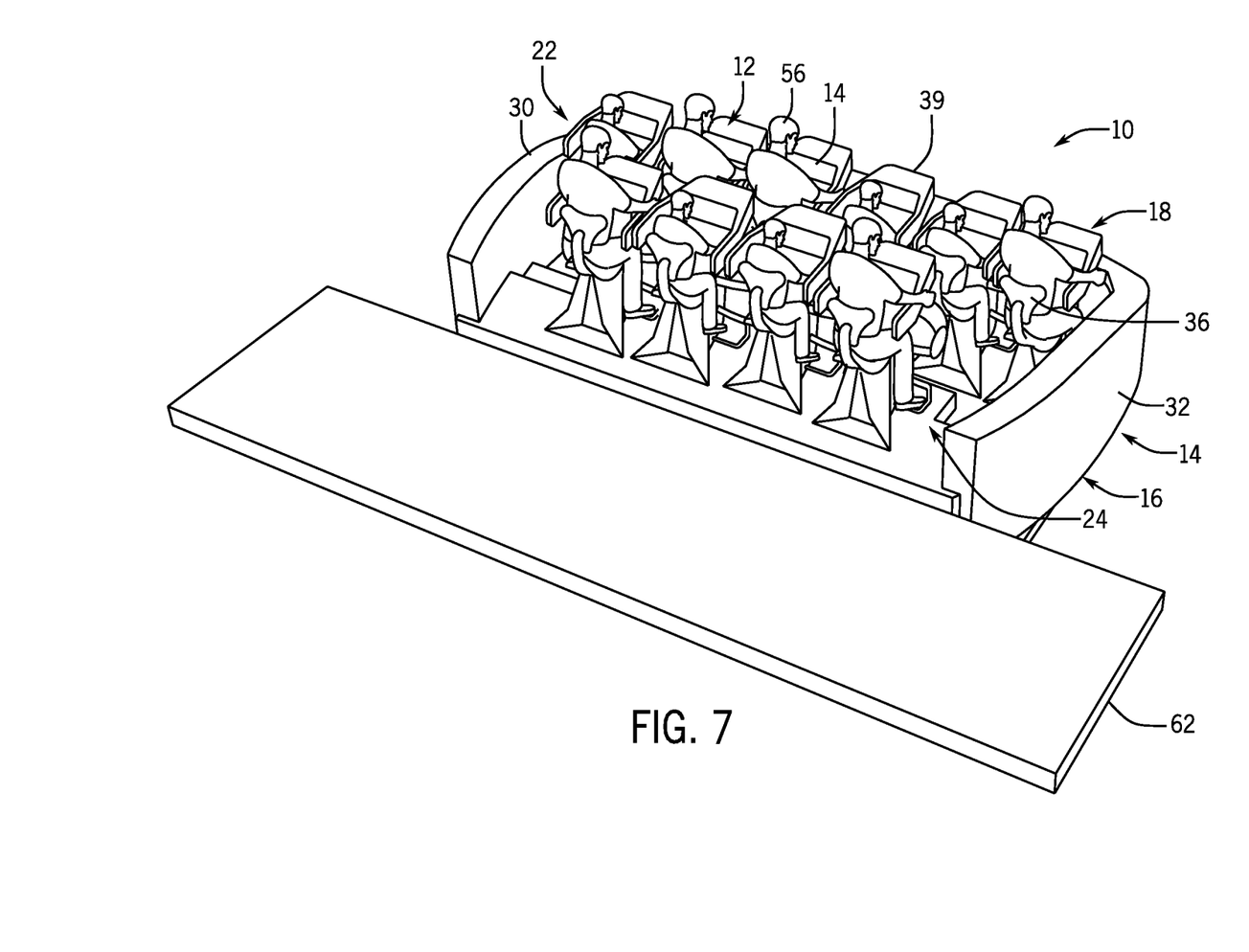
FIG. 7 is a rear perspective view of an embodiment of the ride vehicle of FIG. 1 with passengers seated (e.g., with rear restraints raised), in accordance with an aspect of the present disclosure.

FIG. 4 is a flow chart of an embodiment of a method 58 for loading the ride vehicle 10. The method 58 includes orientating the ride vehicle 10 so that each passenger 56 enters the ride vehicle 10 from the rear 20 (e.g., behind each seat 12 on the ride vehicle 10) (block 60) and over the downturned rear restraint 36. As depicted in FIG. 5, the ride vehicle 10 is oriented so that the rear portion 20 of the platform 14 abuts a load platform 62 where the passengers 56 are awaiting loading. Prior to loading the ride vehicle 10, passengers 56 already on the ride vehicle 10 may have to exit the ride vehicle 10 before reloading the ride vehicle 10. Disembarking may occur at the load platform 62 or at another location prior to orientating the ride vehicle 10 relative to the load platform 62. The method 58 also includes maintaining the rear restraints 36 in a lowered position (e.g., loading configuration) adjacent the platform 14 during the loading of the passengers 56 (block 64). The rear restraints 36 may be lowered or translated from a seating configuration (e.g., contacting the passengers' backs) to a loading configuration (e.g., adjacent or contacting the floor of the ride vehicle 10) during the disembarkation of the previous passengers. The lowered position of the rear restraints 36 enables the passengers 56 to enter the ride vehicle 10 from the rear portion 20 (e.g., via the loading platform 62). A passenger 56, upon proceeding to their respective seat 12, passes over a lowered rear restraint 36 and straddles the seat portion 38 from the rear as depicted in FIG. 6. Once the passengers 56 are seated, the rear restraints 36 are raised until they contact the passengers' backs (e.g., in a seating configuration) (block 66) as depicted in FIG. 7. Together, the front restraint 34 and the rear restraint 36 provide the passenger (while seated in an upright position) the stability to enable a freedom of movement with their arms and upper torso to interact with the ride while in the seating configuration. During loading and/or prior to leaving the load platform 62, a presentation (providing loading and/or ride instructions and/or providing content related to the theme of the ride) may be presented to the passengers 56 (e.g., before the open front portion 18 of the ride vehicle 10) on a display (e.g., a flat screen television, computer monitor, projection surface) integral with or in front of the ride vehicle 10.

Figure 8:
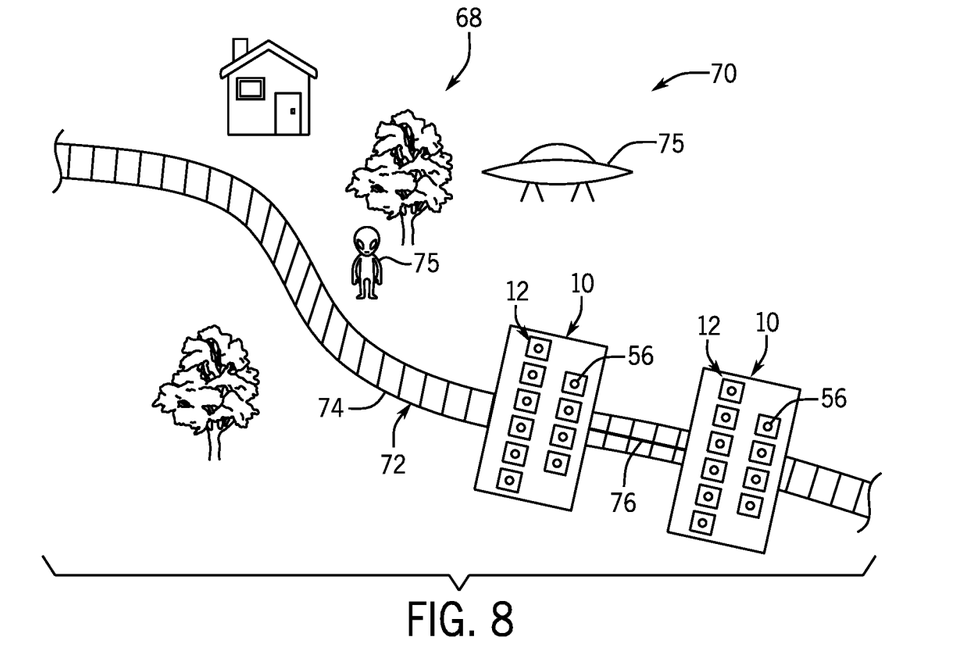
FIG. 8 is a schematic view of an embodiment of a ride system (e.g., dark ride system) in a ride environment (e.g., dark ride environment) with a ride vehicle utilizing a track system, in accordance with an aspect of the present disclosure.

FIG. 8 is a schematic view of an embodiment of a ride system 68 (e.g., dark ride system) in a ride environment 70 (e.g., dark ride environment) with the ride vehicles 10 (e.g., dark ride vehicles) utilizing a track system 72. The ride vehicles 10 are as described in FIGS. 1-7. As depicted, multiple ride vehicles 10 are moving along a track 74 (e.g., path) of the track system 72 through themed elements 75. In certain embodiments (as depicted), multiple ride vehicles 10 may be coupled via a linkage 76 as they move along the track 74. In other embodiments, multiple ride vehicles 10 may move along the track 74 independent of each other (i.e., not physically linked). As described above, each ride vehicle 10 may be capable of at least three degrees of freedom in movements. In certain embodiments, each ride vehicle 10 may be capable of at least six degrees of freedom in movements. These degrees of freedom provide a motion-based attraction (e.g., in a dark ride environment). Some of the movements of the ride vehicles 10 may be determined by gestures of one or more passengers 56.

Figure 9:
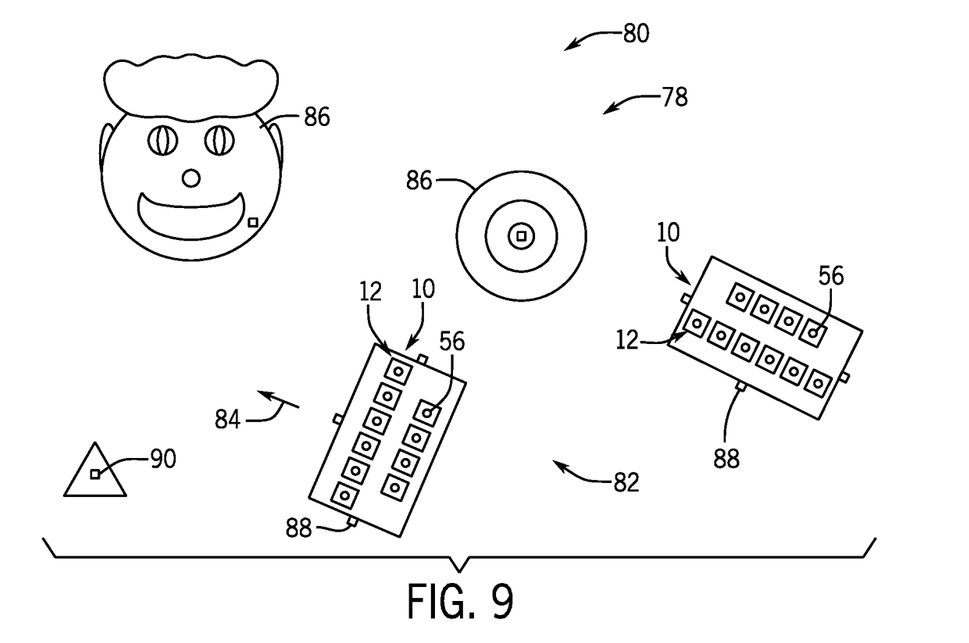
FIG. 9 is a schematic view of an embodiment of a ride system (e.g., dark ride system) in a ride environment (e.g., dark ride environment) with ride vehicles including or using automated guide vehicles, in accordance with an aspect of the present disclosure.

FIG. 9 is a schematic view of an embodiment of a ride system 78 (e.g., dark ride system) in a ride environment 80 (e.g., dark ride environment) with the ride vehicles 10 (e.g., dark ride vehicles) being or using AGVs. The ride vehicles 10 are as described in FIGS. 1-7. As depicted, multiple ride vehicles 10 are moving along a smooth trackless surface 82 along a path 84 through themed elements 86. The path 84 may be predetermined or partially predetermined based on sensors 88 on the ride vehicles 10 detecting markers 90 disposed throughout the ride environment 80 (e.g., on or near the themed elements 86) to guide the vehicles 10. In some embodiments, the sensors 88 and markers 90 may be swapped so that the markers 90 are disposed on the ride vehicles 10 and the sensors 88 are disposed throughout the ride environment. Further, in some embodiments, the markers 90 and/or the sensors 88 may be utilized in both ways. In certain embodiments, at least a portion of the path 84 or movements of the ride vehicles 10 may be determined (at least partially) by one or more of the passengers 56. As described above, each ride vehicle 10 may be capable of at least three degrees of freedom in movements. In certain embodiments, each ride vehicle 10 may be capable of at least six degrees of freedom in movements. These degrees of freedom provide a motion-based attraction (e.g., in a dark ride environment). Some of the movements of the ride vehicles 10 may be determined by gestures of one or more passengers 56.

Figure 10:
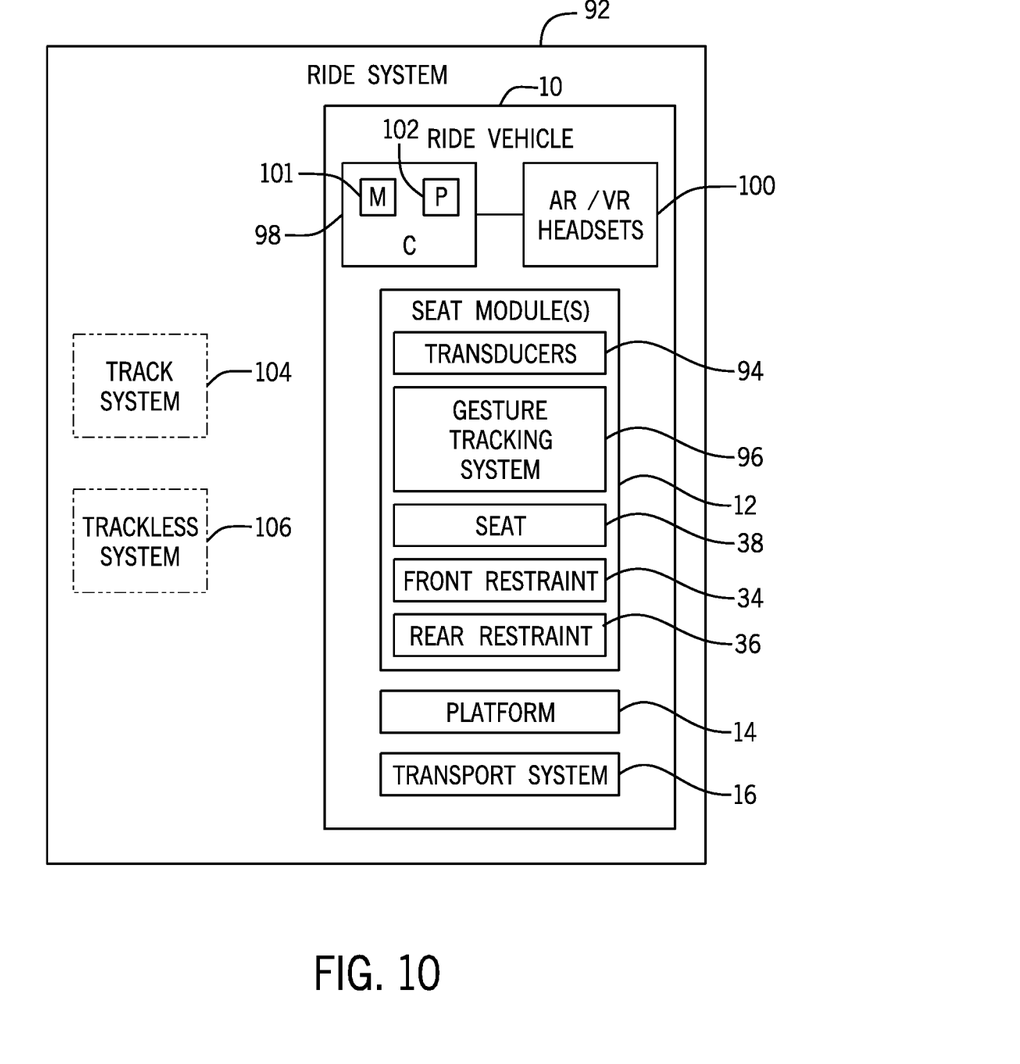
FIG. 10 is a schematic view of an embodiment of the components of a ride vehicle system (e.g., dark ride system) of an amusement attraction (e.g., motion-based dark ride), in accordance with an aspect of the present disclosure.

FIG. 10 is a schematic view of an embodiment of the components of a ride vehicle system 92 (e.g., dark ride vehicle system) of an amusement attraction (e.g., motion-based dark ride). The ride vehicle 10 includes the platform 14 and transport system 16 as described in FIGS. 1 and 2. Also, the ride vehicle 10 includes the plurality of seat modules 12 as described in FIGS. 1 and 2. For example, each seat module 12 includes the front restraint 34, the rear restraint 36, and the seat or seat portion 38 as described above.

Each seat module 12 may include one or more transducers 94. The transducers 94 may be disposed within various components of the seat 12 (e.g., handle bars, front restraint 34, rear restraint 36, seating portion 38, etc.). For example, an audible output may be provided to a passenger via a speaker. The seat module 12 may include tactile transducers that provide stimuli to different parts of the passenger (e.g., face, hands, back, etc.). For example, air or water may be directed at the passenger. Also, a scent may be released. Also, haptic stimuli may be provided by an object pushing against or contacting a portion of the passenger. Also, a temperature of a portion of the seat module 12 may be adjusted to provide a stimulus.

Each seat module 12 may also include a gesture tracking system 96 (e.g., within an equipment box incorporated within the seat module 12). The gesture tracking system 96 may be coupled to a controller 98 of the ride vehicle 10 (e.g., located on or remotely from the ride vehicle 10) and track the gestures of the seated passenger. In response to the detected gestures of the passenger, a movement of the ride vehicle 10 may be altered. For example, the ride vehicle 10 may spin, turn, alter a path, or change orientation. The ride vehicle 10 may alter movement based on the gestures of one passenger or multiple passengers. In certain embodiments, the detected gestures may alter what the passenger sees within their respective AR or VR headset 100. The gesture tracking system 96 may also represent a system that operates to track movement of the passenger (e.g., leaning in the seat module 12) and control based on such movement in conjunction with or separately from other forms of gesturing.

The ride vehicle 12 may also include AR or VR headsets 100 for each passenger to wear on their head during the ride that enables the passenger to interact with an AR or VR environment related to the theme of the ride. The AR or VR headset 100 for each seat 12 may be coupled (e.g., physically, electronically, communicatively, etc.) to the respective seat 12 and/or the ride vehicle 10. Each AR or VR headset 100 may be coupled to the ride controller 98.

The ride controller 98 may be disposed within the ride system 92 (e.g., in each ride vehicle 10 (as depicted), or somewhere throughout the ride environment), or may be disposed outside of the ride system 92 (e.g., to operate the ride system 92 remotely). The controller 98 may include a memory 101 with stored instructions for controlling components in the ride system 92 (e.g., AR or VR headsets 100, transducers 94, gesture tracking system 96, rear restraint 36, transport system 16, etc.). In addition, the controller 98 may include a processor 102 configured to execute such instructions. For example, the processor 102 may include one or more application specific integrated circuits (ASICs), one or more field programmable gate arrays (FPGAs), one or more general purpose processors, or any combination thereof. Additionally, the memory 101 may include volatile memory, such as random access memory (RAM), and/or non-volatile memory, such as read-only memory (ROM), optical drives, hard disc drives, or solid-state drives.

In certain embodiments, the ride system 92 includes a track system 104 (e.g., similar to track system 72 in FIG. 8) for transport of the ride vehicles 10. In other embodiments, the ride system 92 includes a trackless system 106 (as described in FIG. 9) for transport of the ride vehicles 10 (e.g., utilizing AGVs).

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosed subject matter have been illustrated and described herein, many modifications and changes will occur to those skilled in the art. It is, therefore, to be understood that the appended claims are intended to cover all such modifications and changes as fall within the true spirit of the disclosed subject matter.

The invention claimed is:

1. A ride vehicle, comprising:
a platform comprising a front portion and a rear portion, wherein the rear portion is open; and
a first row of seats adjacent the front portion and a second row of seats adjacent the rear portion, wherein the first and second rows of seats are disposed on a deck on the platform, wherein:
each seat of the first and second rows of seats is configured to have a passenger load from a rear of the seat and once seated have the passenger facing the front portion,
the ride vehicle is configured to have each passenger, for both the first and second rows of seats, enter the ride vehicle via the rear portion and from behind each seat of the first and second rows of seats, and
the ride vehicle is configured to have each passenger for the first row of seats pass the second row of seats to reach the first row of seats.

2. The ride vehicle of claim 1, wherein each seat of the first and second rows of seats comprises a gesture tracking system coupled to a controller of the ride vehicle, wherein the gesture tracking system is configured to detect gestures of the passenger and to cause the controller to alter movement of the ride vehicle based on the detected gestures of the passenger.

3. The ride vehicle of claim 1, wherein each seat of the first and second rows of seats is configured to enable a seated passenger freedom of movement with their arms and upper torso to interact with a ride.

4. The ride vehicle of claim 1, wherein each seat of the first and second rows of seats comprises a back restraint, wherein the back restraint is configured to be lowered toward the platform to facilitate passenger loading from the rear and configured to be raised to contact a back of the passenger to facilitate seated support of the passenger.

5. The ride vehicle of claim 1, wherein each seat of the first and second rows of seats comprises a pad that is configured to be disposed about a front of the passenger when the passenger is seated.

6. The ride vehicle of claim 1, comprising a transport system coupled to the platform, wherein the transport system is configured to enable movements of the ride vehicle in six degrees of freedom.

7. The ride vehicle of claim 1, wherein each seat of the first and second rows of seats comprises transducers disposed therein to provide audible or tactile stimuli to a seated passenger.

8. The ride vehicle of claim 1, wherein each seat of the first and second rows of seats comprises an augmented reality or virtual reality headset configured to be worn by a seated passenger during a ride to enable the seated passenger to interact with an environment of the ride.

9. The ride vehicle of claim 1, wherein the first row of seats is disposed on a first deck and the second row of seats is disposed on a second deck, and the first deck is disposed lower than the second deck.

10. A ride system, comprising:
a ride vehicle comprising:
a platform comprising a front portion and a rear portion, wherein the rear portion is open;
a first row of seats and a second row of seats disposed on a deck on the platform and oriented in a same direction, wherein each seat of the first and second rows of seats is configured to have a passenger load from a rear of the seat and once seated the passenger faces forward, wherein each seat of the first and second rows of seats comprises a pad configured to be disposed about a front of the seated passenger and a back restraint configured to both contact a back of the seated passenger in a seating configuration and translate out of the seating configuration into a loading configuration, wherein the pad and the back restraint are configured to enable the seated passenger freedom of movement with their arms and upper torso to interact with a ride environment while in the seating configuration, and the ride vehicle is configured to have each passenger for both first and second rows of seats enter the ride vehicle via the rear portion and from behind each seat of the first and second rows of seats, and the ride vehicle is configured to have each passenger for the first row of seats pass the second row of seats to reach the first row of seats.

11. The ride system of claim 10, wherein the back restraint of each seat of the first and second rows of seats is configured to be lowered toward the platform in the loading configuration to facilitate passenger loading of the first and second rows of seats from the rear and wherein the back restraint is configured to be raised to contact the respective backs of the seated passengers in the seating configuration.

12. The ride system of claim 10, wherein the ride vehicle comprises a transport system configured to transport the ride vehicle through the ride and to enable movements of the ride vehicle in six degrees of freedom.

13. The ride system of claim 12, wherein each seat of the first and second rows of seats comprises a gesture tracking system coupled to a controller of the ride vehicle, wherein the gesture tracking system is configured to detect gestures of the passenger and to cause the controller to alter movement of the ride vehicle based on the gestures.

14. The ride system of claim 13, comprising a plurality of augmented reality or virtual reality headsets configured to be worn by the passengers during the ride to enable the passengers to interact with an environment of the ride system.

15. The ride system of claim 12, wherein the ride vehicle is configured to move along a track of a dark ride system.

16. The ride system of claim 12, wherein the ride vehicle is an automated guide vehicle configured to move within a trackless environment.

17. The ride system of claim 12, wherein one or more components of each seat of the first and second rows of seats comprises transducers disposed therein to provide audible or tactile stimuli to the seated passenger.

18. A method for loading a ride vehicle, the method comprising:
orienting the ride vehicle to have each passenger enter the ride vehicle from behind each seat of a first row of seats and a second row of seats disposed on a deck of a platform of the ride vehicle, wherein the platform comprises a front portion and a rear portion, the rear portion is open, the first row of seats is adjacent the front portion, and the second row of seats is adjacent the rear portion, wherein each seat of the first and second rows of seats is oriented in a same direction, and each seat of the first and second rows of seats comprises a pad configured to be disposed about a front of a seated passenger and a back restraint configured to contact a back of the seated passenger, and wherein the ride vehicle is configured to have each passenger for both first and second rows of seats enter the ride vehicle via the rear portion and to have each passenger for the first row of seats pass the second row of seats to reach the first row of seats;
maintaining the back restraint of each seat of the first and second rows of seats in a lowered position to enable passengers to load respective seats from a rear; and
raising the back restraint of each seat of the first and second rows of seats to contact the back of the seated passenger so that the seated passenger is seated in an upright position between the pad and the back restraint to enable the seated passenger freedom of movement with their arms and upper torso to interact with a ride environment while securing the seated passenger to the ride vehicle.

19. The method of claim 18, comprising presenting a presentation during the loading of the ride vehicle, wherein the presentation is presented before an open portion of the ride vehicle that the fronts of the seats are oriented toward.

* * * * *